(No Model.)
J. M. LE VALLEY.
SEED DRILL.
No. 342,522. Patented May 25, 1886.
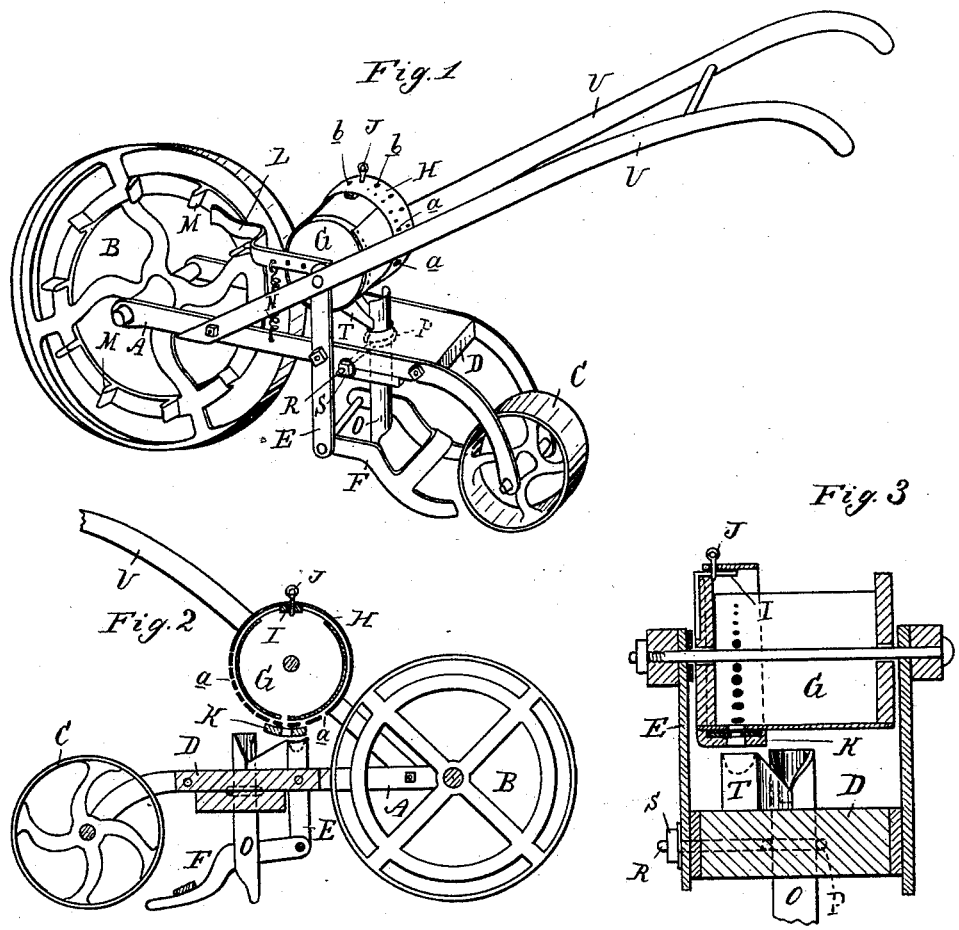
Attest:
John Schuman
E. F. Scully
Inventor:
John M. Le Valley
by his Atty
Thos. S. Sprague

UNITED STATES PATENT OFFICE.

JOHN M. LE VALLEY, OF EASTON, MICHIGAN.

SEED-DRILL.

SPECIFICATION forming part of Letters Patent No. 342,522, dated May 25, 1886.

Application filed January 29, 1886. Serial No. 190,185. (No model.)

*To all whom it may concern:*

Be it known that I, JOHN M. LE VALLEY, of Easton, in the county of Ionia and State of Michigan, have invented new and useful Improvements in Seed-Drills; and I do hereby declare that the following is a full, clear, and exact description thereof, reference being had to the accompanying drawings, which form a part of this specification.

This invention relates to certain new and useful improvements in seed-drills; and the invention consists, first, in the peculiar construction of the hopper and index or feed-gage; second, in the peculiar construction of the conductor; third, in the means employed for securing the handle; and, fourth, in the peculiar construction, arrangement, and combination of the various parts, all as more fully hereinafter described.

Figure 1 is a perspective from the rear of my improved seed-drill. Fig. 2 is a vertical longitudinal section, and Fig. 3 is a vertical cross-section.

In the accompanying drawings, which form a part of this specification, A represents a suitable frame, in the forward end of which is suitably journaled the traction-wheel B, while in the rear end is properly journaled the governing-wheel C, and between these two wheels the side bars of the frame have secured between them the bed-block D. At each side of the frame is secured a standard, E, between the lower ends of which is pivotally secured a shoe, F, the free ends of the arms of which converge toward each other for the purpose of forcing the loose ground over upon the planted seed, which is subsequently rolled down by the wheel C in the forward movement of the device. Between the upper ends of the standards E is pivotally hung a cylindrical hopper, G, which is provided upon its upper side with a proper feed-opening, which should be covered by a suitable slide or door, while in its lower face or side, and near one end of the hopper, is formed a discharge-opening.

H is an index-band, which encircles the hopper G, as shown, and is provided with a series of holes, *a*, of various sizes, one of such openings being designed to be brought coincident with the discharge-opening of the hopper, according to the grain or seed to be planted, and *b* is another series of holes in the band, designed to be brought coincident with a hole in the free end of the arm I, which is secured to the corresponding end of the hopper, and these last-described holes have arranged alongside of them, upon the band, the words "Corn," "Peas," "Beans," &c., so as to indicate to the farmer that if the hole *b* marked "Corn" is brought coincident with the hole in the arm I, and secured there by the pin J, passing through both, the proper opening in the band has been brought coincident with the discharge of the hopper to allow corn to pass through to the drill.

To prevent the lodging of seed between the band and the hopper at the discharge, I secure to the hopper a block, K, the upper face of which is recessed just sufficiently to allow the index-band to be moved easily around the hopper, and still leave no space between the band and hopper to catch the seed.

Upon the opposite end of the hopper from that which carries the index-band is rigidly secured an arm, L, the free end of which projects forward beyond the circle of the wheel B, which carries a series of striker-studs, M, which latter, in the forward motion of the machine, successively strike the end of such arm and raise the same, thereby partially rotating or oscillating the hopper, such arm being provided with a spring, N, for retaining or drawing back the arm into its lowest position.

O is the drill-spout, which passes up through the bed-block D, and is secured therein in a vertically-adjustable position by means of a ring, P, through which it also passes, such ring being provided with a threaded arm, R, which projects laterally through the bed-block and receives upon its outer end a nut, S.

T is a feed spout or trough secured upon the bed-block D, its larger and receiving end being below the discharge of the hopper, while its lower end conducts the seed to the drill-spout.

U are the handles, the lower ends of which are secured to the frame A, as shown, and to the upper ends of the standards E by the same bolt which passes through and secures the hopper in place, as shown.

In practice the band H is adjusted upon the hopper so as to bring the proper opening therein coincident with the discharge of the hopper for planting the desired seed. The seed is then placed in the hopper, and the operator pushes the machine ahead of him, the turning of the wheel B causing the striker-studs to come in contact with the arm L of the hopper, such "striking" compelling the seed to fall through the discharge-opening into the trough T, from whence it passes to the drill-spout, and is "planted" as in the ordinary manner.

It will be observed that the standards E support the handles and the hopper and carry the shoe which covers the grain, thus greatly simplifying the construction of the device.

What I claim as my invention is—

1. In a seed-drill, the combination, with the hopper G, having single discharge, and the arm I, of the index-band H, provided with two series of holes, $a$ $b$, the holes $a$ designed to register with the opening in the hopper, and the holes $b$ with an opening in the arm I, and the removable pin J, substantially as and for the purposes specified.

2. In a seed-drill, the combination of the hopper G, index-band H, and arm L with the striker traction-wheel B, substantially as and for the purposes set forth.

3. In a drill of the kind described, the combination of the bed-block D, drill-spout O, and link P, substantially as and for the purposes described.

4. In a seed-drill of the kind described, the combination of the frame A and standards E, as a means of supporting the hopper and handles, substantially as described.

5. In a seed-drill, the combination, with the hopper G and index-band H, provided with holes $a$, as described, of the block K, arranged and operating substantially as and for the purposes specified.

JOHN M. LE VALLEY.

Witnesses:
F. S. HUTCHINSON,
F. L. WAGAR.